Sept. 1, 1942.  A. G. BROWN  2,294,714
WEIGHING SCALE
Filed June 19, 1940   2 Sheets-Sheet 1
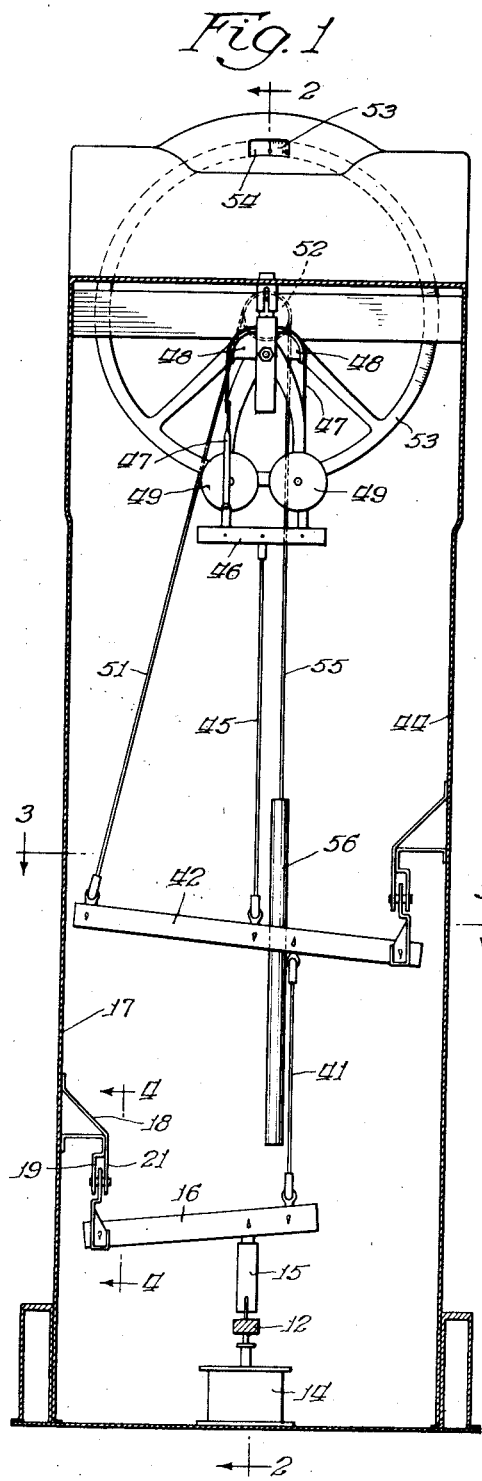
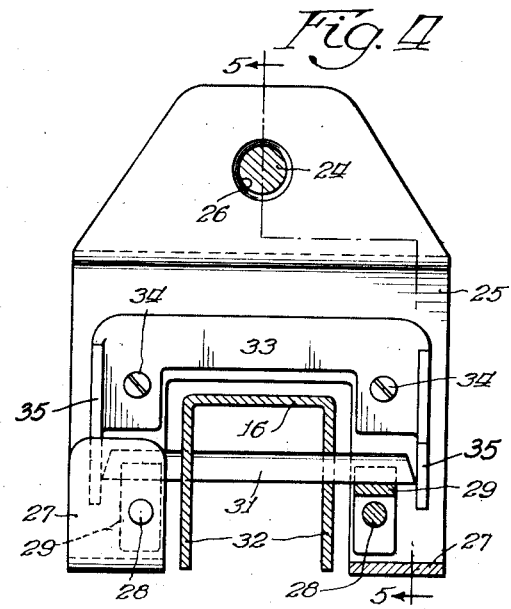
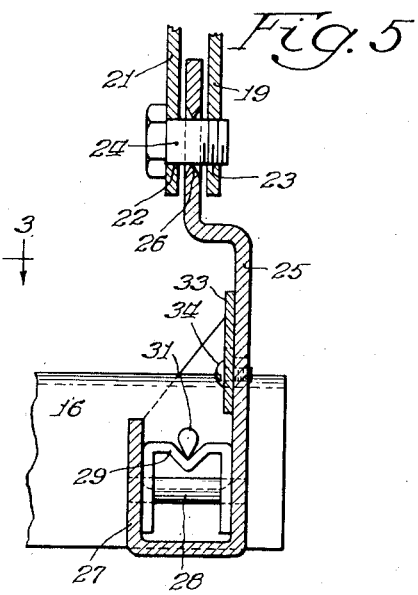
Inventor:
Andrew G. Brown
By:

Sept. 1, 1942.     A. G. BROWN     2,294,714
WEIGHING SCALE
Filed June 19, 1940     2 Sheets-Sheet 2
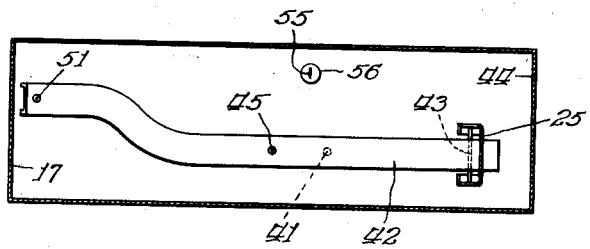
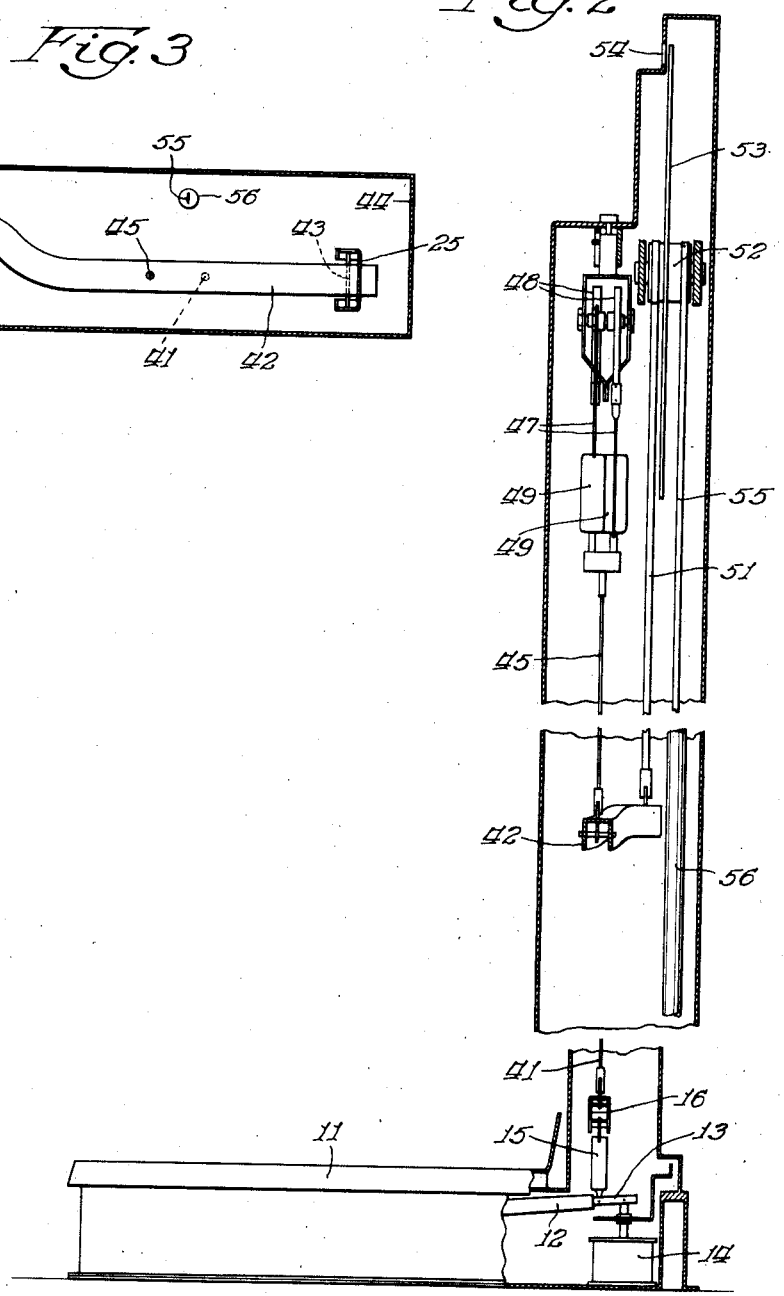
Inventor:
Andrew G. Brown
By: Walter M. Fuller Atty.

Patented Sept. 1, 1942

2,294,714

UNITED STATES PATENT OFFICE 2,294,714

WEIGHING SCALE

Andrew G. Brown, Chicago, Ill., assignor to Triner Scale & Manufacturing Company, Chicago, Ill., a corporation of Illinois Application June 19, 1940, Serial No. 341,245

2 Claims. (Cl. 265—61)

The present invention relates to certain features of betterment and advantage in weighing-scales, such for example, as the type and style of scale presented in United States Patent 2,138,-261, Triner, Scale, granted November 29, 1938, the principal objects of the instant invention being to provide a scale which is more accurate in operation, which comprises relatively few mechanical elements, which functions accurately over a longer period of service, which has less friction, which is cheaper and easier to construct, which automatically compensates by rocking, and which possesses self-correction for slight variations or changes in floor-levels, etc.

For the attainment of these and other desirable aims and purposes which will become more apparent from what follows, a present preferred embodiment of the invention has been constructed and has been illustrated in the accompanying drawings forming a part of this specification and to which reference should be had in connection with the following detailed description.

Those acquainted with this art and craft will readily understand and appreciate the structural and functional advantages incident to the use of a scale of this improved character and they will also understand that the invention is susceptible of a variety of embodiments or incorporations in physical form differing more or less in details but all embracing the underlying and basic features of the invention.

In these drawings, in which, for simplicity, like reference numerals have been employed to designate the same parts throughout the several views:

Figure 1 shows the scale-mechanism housed in the upright standard or column of the scale, the front wall of the latter being omitted;

Figure 2 is a vertical cross-section through such standard on line 2—2 of Figure 1, the base and platform being illustrated substantially wholly in elevation;

Figure 3 is a horizontal cross-section on line 3—3 of Figure 1;

Figure 4 is a vertical section on line 4—4 of Figure 1 on an enlarged scale; and Figure 5 is a vertical section on line 5—5 of Figure 4.

By reference to the specified views of these drawings, it will be perceived that the scale-platform 11, which is mounted on levers as shown in such Patent 2,138,261, is thereby connected to an extension or nose-piece 12 (Fig. 2) which in turn is equipped with a projection 13 operatively joined to a dash-pot structure 14 of usual construction and action, whereby retardation and regulation of the movements of the various parts of the scale are effected in known manner.

Nose-piece 12, through its extension 13, is operatively connected by a link 15 to an intermediate portion of a lower transmission-lever 16 fulcrumed at one end through a suitable mechanism mounted on wall 17 of the housing, such structure comprising a bracket 18 fixed, as by welding or otherwise, to the inner surface of such wall and having a pair of stationary, spaced-apart, downwardly-directed walls 19, 21, wall 21 having a hole 22 therethrough in alignment or register with a screw-threaded hole 23 through the complementary or opposite wall 19, the two openings or holes accommodating a bearing-bolt 24, preferably of hardened metal, which may be screwed firmly and securely in place.

Hung on and rockable on such bolt is a depending bent-hanger 25 having a hole through its upper end bordered by a round knife-edge 26 which somewhat loosely receives and bears on the bolt (Fig. 5).

At its lower end, such hanger is centrally apertured or cut away and bent to provide a pair of aligned, spaced hooks 27, 27, each equipped with a round bearing rod or shaft 28 bridging the space in the hook and having rockingly mounted thereon a knife-edge bearing-member 29 in the top V-shaped recess of which one end portion of a downwardly-facing, knife-edge rod or shaft 31 is accommodated, such element 31 extending and projecting through like-shaped holes in the opposite side-walls 32, 32 of the lever 16, whereby the rod constitutes the fulcrum-element for the lever.

To maintain the sharp-edged member 31 against lengthwise movement in a practically-frictionless manner, a retaining-member 33 is fastened to the hanger 25 by screws 34, 34, and it has two, outstanding, flat, parallel wings 35, 35 against which pointed ends of the rod 31 bear, as shown perhaps most clearly in Figure 4.

This transmission-lever with its cross, knife-edge fulcrum-shaft 31 has knife-edge engagement with the two supporting members 29, 29 which are automatically self-aligning on their respective supporting rods or shafts 28, 28, and these in turn can swing or shift laterally with the hanger on which they are mounted, such hanger having the round knife-edge bearing on the supporting-bolt 24, permitting the hanger to rock both crosswise and longitudinally of the axis of the bolt.

From the foregoing, it will be seen that the lever 16 has a universal knife-edge mounting with a minimum of friction.

By means of a suitable link 41, lever 16 is operatively joined to an intermediate portion of another, longer, upper transmission-lever 42 fulcrumed universally on the opposite wall 44 of the standard or housing, the fulcrum of such lever being like that of the shorter, lower, complementary lever 16.

At a point about the middle of the length of lever 42, a metal-tape or its equivalent 45 connects the lever to an equalizer-bar 46 jointed at its opposite ends to, and actuating, metal tapes or bands 47, 47 operatively connected to a weight-absorbing pendulum-mechanism incorporating oscillatory eccentric-sectors 48, 48 to which the tapes are attached and around the non-concentric surfaces on which they bear, such sectors having pendulum-elements 49, 49, mounted thereon, whereby descent of lever 42 causes the two pendulums to separate and swing upwardly in opposite directions amounts corresponding to the degree of downward rocking of the lever, this general compound-pendulum weight-absorbing construction being shown in United States Patents 1,290,415 and 2,138,261.

The unfulcrumed end of lever 42 has a flexible metal tape or band 51 secured thereto, the opposite end of such metal element being fastened to a drum 52 on a suitably-mounted oscillatory-shaft of, or to the hub of, a weight-graduated display-disc 53, a small active portion of the scale of which is visible through a window or opening 54 in the front of the housing, the same drum or hub having another similar tape or band 55 secured thereto and carrying a counterweight 56 at its lower end.

When there is no load on the platform 11, the several coacting and associated parts of the weighing-mechanism are counter-balanced by the depending weight 56, the pendulums 49, 49 occupying their lowermost positions as indicated in Figure 1, and the zero graduation of the dial is exposed through the window 54, and, when a load is placed on the platform to be weighed, the nose-piece 12 and its extension 13 descend a distance corresponding to the weight of the load, lever 16 is rocked downwardly and this in turn swings the upper lever 42 downwardly, such latter movement through the action of the tape 45 separating the pendulums outwardly and upwardly just enough to balance the weight of the load, and, of course, the specified movement of lever 42 through tape 51 turns the dial to display the correct weight of the load through the display-window 54.

Inasmuch as each of the two oppositely-arranged levers 16 and 42 has its knife-edge fulcrum-rod 31 mounted in self-aligning bearings 29, 29, and, since the hangers 25, 25 carrying such elements 29 and 31 are capable of swinging in limited degree in any direction by reason of their rockable, circular, knife-edge mountings 26, 24, the two cooperating transmission-levers are capable of adjusting themselves automatically with relation to one another under the strains to which they are subjected, whereby they function with greater accuracy and operate with precision over long periods of time, they effect self-correction for minor changes in floor-level, and they operate with a minimum of friction.

Again, the direct connection of the lever 42 with the dial drum or hub through means of the metal tape 51 avoids all intermediate members requiring bearings or their equivalent with resulting expense and avoidable friction.

In similar manner, the lever 42 is directly connected to the pendulum, weight-absorbing mechanism with resulting similar advantages.

As to the two, inter-connected, cooperating, oppositely-arranged transmission-levers, the strains placed on each of them and its mounting by reason of the load on the platform effecting its rocking movements are compensated for by its own automatically-adjustable bearing and also by that of its associated complementary lever to which it is directly connected in the manner indicated.

Thus the two transmission-levers, by reason of their peculiar anti-friction mountings, are free to accommodate themselves singly and conjointly to accurately perform their combined functions with certainty throughout a long period of use.

Those acquainted with this art will readily understand that the invention, as defined by the appended claims, is not necessarily limited and restricted to the details of structure herein set forth and that various modifications and changes may be resorted to without departure from the heart and essence of such invention and without the loss of any of its substantial or material benefits or advantages.

I claim:

1. In a weighing-scale having in combination, a first transmission-lever extending in one direction from its fulcrum, a scale-platform, means to rock said lever on its fulcrum by the weight of the load on said scale-platform, a second transmission-lever extending from its fulcrum in a direction substantially the opposite of that of said first transmission-lever from its fulcrum, means operatively connecting said first transmission-lever to said second transmission-lever whereby turning of said first transmission-lever on its fulcrum causes said second transmission-lever to turn on its fulcrum, a compound-lever weight-absorbing means including a pair of eccentric-sectors, an equalizer, tapes connected to and cooperating with the eccentric surfaces of said sectors and also connected to said equalizer, a movable weight-indicating means, a member to actuate said equalizer, means to operate said weight-indicating means, and means counter-balancing said foregoing mechanism when there is no load on the scale-platform, the novel cooperating features being a universal-movement mounting for the fulcrum of each of said transmission-levers; said equalizer actuating-member directly operatively connecting said second transmission-lever to said equalizer, said weight-indicating operating-means comprising a drum and a tape directly operatively connecting said drum to said second transmission-lever, the fulcrum-mounting for at least one of said transmission-levers, including a knife-edge fulcrum-bar fixedly mounted on the lever, a bracket supported on the scale, a cylindrical-member carried by said bracket, a hanger having a circular knife-edge bearing surrounding and bearing on said cylindrical-member, and a pair of spaced-apart, self-aligning bearing-blocks carried by said hanger and on which the knife-edge of said fulcrum-bar bears.

2. The novel features in weighing-scales presented in claim 1 in which the fulcrum mounting for each of said transmission-levers is like that presented for at least one of said fulcrum-mountings set forth in claim 1.

ANDREW G. BROWN.